Patented Feb. 15, 1927.

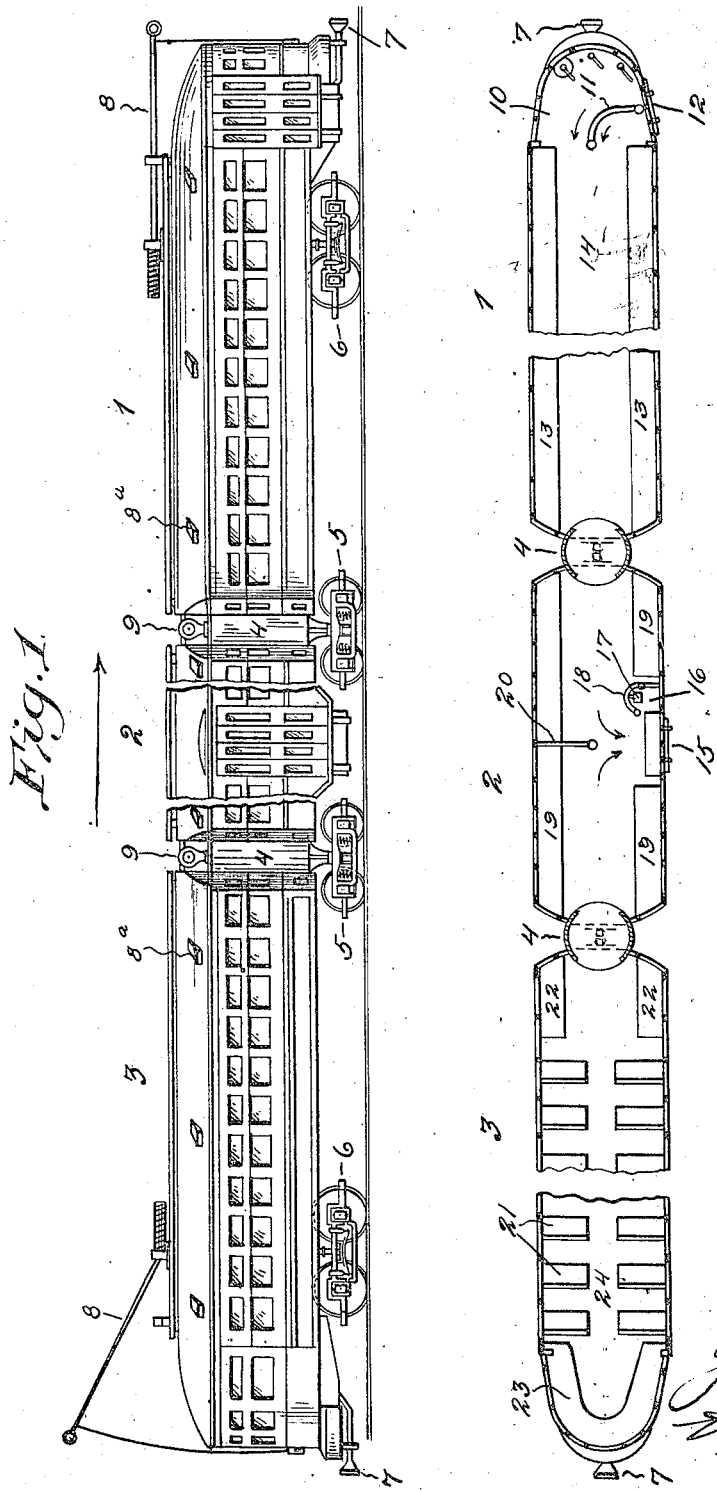

1,617,658

UNITED STATES PATENT OFFICE.

JOSEPH M. SUAREZ, OF BALTIMORE, MARYLAND.

ARTICULATED CAR.

Application filed October 19, 1926. Serial No. 142,634.

The invention relates to articulated cars designed particularly for use on city and interurban surface lines.

The object of the invention, generally stated, is to improve cars of this general type in regard to ease in loading and unloading, collection of fares, safety of the passengers and in other respects to be mentioned.

An important object of the invention, more specifically stated, is to provide a plural section articulated car having an improved construction with respect to the floor plan and seating arrangement as well as location of doors whereby passengers may enter at one end into a certain area where they may remain prior to the paying of the fare, the conductor and the fare box being so stationed as to necessitate payment of the fare before passengers can pass from said area into the fare-paid area or leave the car from either area.

Another object of the invention is to provide an articulated car which will require a crew of only two, a motorman stationed at the front and a conductor stationed at the center, the cost of operation being consequently reduced.

Another object of the invention is to provide an articulated car of this type in which the seats in the fare-paid area extend transversely, the increased comfort to be derived from riding in such seats attracting the attention of the passengers entering the car at the unpaid area where the seats extend longitudinally and are consequently less comfortable, the result being that passengers will be induced to pay their fares promptly so as to pass into the more desirable end of the car, there being, however, no delays in loading or unloading as will of course be apparent.

A still further object of the invention is to provide a car of this character in which the maximum space in the paid area may be utilized for the seating arrangement as the doors are located one at the center and the other at the front and both being controlled readily by the conductor and motorman respectively.

Another object of the invention is to provide an articulated car in which the various sections are connected by specially constructed vestibules which permit free passage therethrough but which exclude drafts from the interior of the car, in addition to serving as means upon which may be mounted the main cable supports which, being properly insulated and prevented from contact with any part of the vestibules, or other car parts, will promote the safety of passengers.

An additional object is to provide an articulated car having preferably three units or sections so mounted with reference to running gear that only four sets of trucks, as well as motors, will be needed, certain of the trucks being of a standard type and others being preferably of special construction inasmuch as they are located beneath the vestibules.

The above and other objects and advantages will become apparent during the course of the following description and from an inspection of the drawing which forms part of the application and in which:

Figure 1 is a side elevation of an articulated car constructed in accordance with my invention.

Figure 2 is a floor plan thereof.

Referring more particularly to the drawing, I have somewhat diagrammatically represented an articulated car embodying three sections 1, 2 and 3, all of which may be similar in so far as detailed construction is concerned but all of which have different seating arrangements as will be hereinafter brought out. The sections are connected by vestibules 4 consisting of interfitting relatively rotatable drums or drum sections of accepted pattern and beneath which are located trucks 5 probably necessarily of special design. The sections 1 and 3 are additionally supported by other trucks 6 of ordinary or standard pattern. I have discovered that it is sufficient to equip the car with four motors of any desired type, two being located on each of the trucks 6, this arrangement naturally reducing stresses and strains on the trucks 5 which are located at the points of articulation.

The endmost sections are of course equipped with the usual or any preferred couplers 7, trolley poles or other current collectors 8, together with the usual adjuncts and auxiliaries. Each section is also provided with ventilators 8ª.

It is very convenient to utilize the tops of the vestibule drums for mounting thereon main cable supports 9 so that the cables will be prevented from contact with the vestibules or other parts of the cars, safety of the passengers being thereby promoted.

A very important feature is the construction of all three sections in the matter of the door and seat arrangement. The motorman is stationed at the front end 10 of the section 1 and the necessary controls are also located at this point. Immediately back of the motorman it is preferable to provide a guard rail 11 which is located at a point intermediate of the doorway which is normally closed by a door or doors 12 of any preferred construction and within ready control of the motorman. Passengers entering may of course pass at either side of the guard rail 11 into the section 1 which is equipped with longitudinally extending seats 13 with an aisle 14 between them along which passengers may walk to the sections 2 and 3.

The exit door 15 is located preferably at the center of the middle section 2 and is controlled preferably by the conductor who is stationed at the point 16 where the fare box 17 is also located. A guard rail 18 is also provided to prevent the conductor from being crowded and to form a support upon which the fare box may be attached. The entire section 1 and that half of the section 2 nearest thereto constitute the unpaid area or space which may be occupied by passengers prior to payment of the fare, it being necessary that the passengers pay their fare when passing the conductor to reach the exit door 15 or to reach the fare-paid area which consists of the entire section 3 and the other half of the section 2. The section 2 is also provided with longitudinally extending seats 19 and projecting out from that side opposite the doorway it is advisable to provide a guard rail 20 which will limit the space through which passengers may walk while passing the conductor, this being of advantage in preventing them from crowding past so rapidly as to accomplish evasion of fare payment.

To render the paid area more attractive so that passengers will hasten to pay in order to enter the same, I prefer to provide transverse seats 21 in the section 3 it being well known that seats of this type are more comfortable especially during a long ride. Short longitudinal seats 22 are preferably provided near the vestibule and the rear end may also be equipped with other seats 23 which follow the contour thereof. The aisle 24 between the transverse seats is intended to be sufficiently wide to accommodate passengers entering or leaving and will also provide standing room in case of unusually crowded conditions. Inasmuch as there is no door in the section 3 the maximum space may be utilized in the matter of seats.

From the foregoing description and a study of the drawing it will be apparent that I have thus provided an articulated car embodying many distinct features of advantage, foremost among which is the facility with which loading and unloading may be carried out, there being no necessity for the car to remain stationary while passengers pay their fares upon entering as is usually the case, all financial transactions being carried out while the car is travelling. Clearly, the usual delays are avoided and transportation made much more rapid than would be otherwise possible. Inasmuch as a crew of only two is necessary the cost of operation will be reduced without in any way detracting from other features of the service or increasing any hazards. The arrangement of trucks, motors and cable supports is also of importance but it is really believed that the construction, operation and advantages in every respect will be readily apparent to one skilled in the art without further explanation.

While I have shown and described the preferred embodiment of the invention, it should of course be understood that the disclosure is merely an exemplification of the principles involved and that the right is reserved to make all such changes and modifications in the details of construction and in the arrangement and combination of parts as will increase the adaptability and widen the field of utility provided such variations constitute no departure from the salient features of the invention or the scope of the claims hereunto appended.

Having thus described the invention, I claim:

1. In an articulated car, a plurality of end sections, an intermediate section pivotally connected therewith, trucks located beneath the pivot points of the sections, and other trucks mounted beneath the outer end portions of the end sections, the second named trucks carrying the power supplying motors.

2. In an articulated car, end sections, an intermediate section, said sections being pivotally connected, vestibule members at the pivots, supporting trucks located beneath the pivots, other trucks of standard pattern located beneath the ends of the end sections, and drive motors carried by said last named trucks.

3. In an articulated car, end sections, an intermediate section, all of the sections being pivotally connected, one end section having an entrance door and the intermediate section having an exit door, the first named end section and half of the intermediate section constituting the area to be occupied by passengers whose fares are unpaid, and the remaining half of the intermediate section together with the other end section defining the area to be occupied subsequent to fare payment.

4. In an articulated car, end sections, an intermediate section, all of the sections being pivotally connected, one end section having an entrance door and the intermediate section having an exit door, the first named end section and half of the intermediate section constituting the area to be occupied by passengers whose fares are unpaid, and the remaining half of the intermediate section together with the other end section defining the area to be occupied subsequent to fare payment, a conductor's station located at the exit door in position necessitating passage of all passengers before the conductor while moving from said unpaid area to the paid area and from either area to the exit door.

5. In an articulated car, end sections, an intermediate section, all of the sections being pivotally connected, one end section having an entrance door and the intermediate section having an exit door, the first named end section and half of the intermediate section constituting the area to be occupied by passengers whose fares are unpaid, and the remaining half of the intermediate section together with the other end section defining the area to be occupied subsequent to fare payment, the first named end section being provided with longitudinal seats and the second named end section being provided with transverse seats.

6. In an articulated car, end sections and an intermediate section all pivotally connected, the forward end section having an entrance door near the motorman's station and the intermediate section having an exit door adjacent the conductor's station, the forward section and the portion of the intermediate section in advance of the conductor's station constituting an area to be occupied by passengers prior to fare payment, and the rear section and portion of the intermediate section to the rear of the conductor's station constituting an area to be occupied by passengers subsequent to fare payment, and seats in all of the sections.

7. In an articulated car, end sections and an intermediate section all pivotally connected, the forward end section having an entrance door near the motorman's station and the intermediate section having an exit door adjacent the conductor's station, the forward section and the portion of the intermediate section in advance of the conductor's station constituting an area to be occupied by passengers prior to fare payment, and the rear section and portion of the intermediate section to the rear of the conductor's station constituting an area to be occupied by passengers subsequent to fare payment, and seats in all of the sections, the seats in the unpaid area extending longitudinally of the car and those in the paid area extending transversely.

8. In an articulated car, a plurality of pivotally connected sections, vestibules at the pivotal connections, and main cable supports mounted above the tops of the vestibules for maintaining the cables out of contact with the vestibules and adjacent parts.

In testimony whereof I affix my signature.

JOSEPH M. SUAREZ.